United States Patent [19]

Konomi

[11] Patent Number: 5,745,107
[45] Date of Patent: Apr. 28, 1998

[54] WINDOW DISPLAY CONTROL SYSTEM FOR COMPUTERS AND METHOD THEREFOR

[75] Inventor: Noriaki Konomi, Tokyo, Japan

[73] Assignee: NEC Corporation, Tokyo, Japan

[21] Appl. No.: 825,701

[22] Filed: Mar. 19, 1997

Related U.S. Application Data

[63] Continuation of Ser. No. 258,492, Jun. 10, 1994, abandoned.

[30] Foreign Application Priority Data

Jun. 11, 1993 [JP] Japan .................... 5-166002

[51] Int. Cl.$^6$ ........................................ G09G 5/14
[52] U.S. Cl. ........................................ 345/332
[58] Field of Search ................... 345/2, 119, 120, 345/332; 395/331, 332, 344, 357, 340

[56] References Cited

U.S. PATENT DOCUMENTS

| | | | |
|---|---|---|---|
| 4,712,191 | 12/1987 | Penna | 345/119 X |
| 4,974,173 | 11/1990 | Stefik et al. | 345/2 X |
| 4,974,196 | 11/1990 | Iwami et al. | 345/119 X |
| 5,107,443 | 4/1992 | Smith et al. | 395/158 |
| 5,230,041 | 7/1993 | Dinwiddie, Jr. et al. | 395/157 X |

*Primary Examiner*—Amare Mengistu
*Attorney, Agent, or Firm*—Foley & Lardner

[57] ABSTRACT

The window display control system comprises a display unit capable of displaying a plurality of windows and a plurality of input devices for data input. It further comprises a data distinction unit which checks the data input from the input devices to distinguish the data to select one of the plurality of windows or to cancel a selected window from other input data, a window selection unit which, when the data distinguished by the data distinction unit is for window selection or cancellation, establishes or cancels correspondence between the applicable input device and the applicable window, and a display control unit which, when the data distinguished by the data distinction unit is the input data other than those for window selection or cancellation, sends the data for display in the window having correspondence with the applicable input device according to the instruction from the window selection unit.

12 Claims, 5 Drawing Sheets

| | | WINDOW | | | |
| --- | --- | --- | --- | --- | --- |
| | | 11 | 12 | 13 | 14 |
| INPUT DEVICE | 17 | △ | △ | △ | △ |
| | 22 | △ | △ | △ | △ |
| | 23 | △ | △ | △ | △ |

WINDOW DISPLAY CONTROL SYSTEM FOR COMPUTERS AND METHOD THEREFOR

This application is a continuation of application Ser. No. 08/258,492, filed Jun. 10, 1994, now abandoned.

BACKGROUNDS OF THE INVENTION

1. Field of the Invention

The present invention relates to a window display control system used in a computer to control display of a plurality of windows shown on a display unit such as a CRT display and a method therefor.

2. Description of the Related Art

Recent computer systems require the display unit not only to display data but also to provide various sophisticated functions as a man-machine interface. One of the ways to accomplish such request is the multiple window display method. Specifically, a display screen on a display unit is divided into a certain number of display areas (hereinafter referred to as "windows") so that different data are input and displayed for different windows.

Conventionally, such a multiple window system is often controlled by a window control method where, with a mouse or other devices, a certain window on screen is selected and activated so that information based on the data input from the input device is displayed on such active window.

However, such a conventional window control method has a drawback in that data is input to a window only after activating that window for data input and the data cannot be supplied to a plurality of windows at the same time.

In particular, when a plurality of input devices are connected to a computer system and each of them has a corresponding window, each time data is input from an input device to a corresponding window, the applicable active window must be selected corresponding to the input device for data input. This makes the operation complicated.

SUMMARY OF THE INVENTION

It is an object of the present invention to solve such drawback of the conventional method and to provide a window display control system for a computer using a new method which enables data input from a plurality of input devices to a plurality of windows at a time.

It is another object of the present invention to provide a window display control system using a new method which realizes facilitated selection and control of a plurality of windows from a plurality of input devices.

According to a preferred embodiment to attain the above object, a window display control system in a computer comprises display means capable of displaying a plurality of windows, a plurality of input means for data input, data distinction means which checks the data input from the input means to distinguish the data for selection of a window from the plurality of windows or for cancellation of a selected window from other input data, window selection means to establish or cancel a correspondence between the input means and the window when the data checked by the data distinction means is for selection or cancellation of the window, and display control means to send and display the data to the window having correspondence with the input means through operation of the window selection means when the data checked by the data distinction means is found to be a data other than window selection/cancellation data.

According to another preferred embodiment, when the data checked by the data distinction means is to select a window, the window selection means judges whether there is a correspondence between the input means providing the data and the window selected by the data and, if there is no such correspondence, establishes a correspondence between the input means and the selected window when the data checked by the data distinction means is to cancel a correspondence with window, the window selection means judges whether there is a correspondence between the input means providing the data and the window for which the cancellation of correspondence is instructed and, if there is such a correspondence, cancels the correspondence between the input means and the selected window.

According to still another preferred embodiment, a window display control system in a computer further comprises a correspondence table to store the information to show whether or not there is a correspondence between the input means and the windows, the window selection means referring to the correspondence table to judge whether there is a correspondence between the input means providing window selection instruction data and the window selected by the data or whether there is a correspondence between the input means providing window cancellation instruction data and the window selected by the data.

According to another preferred embodiment, a display control system in a computer further comprises a data distinction information storage unit storing the distinction information to distinguish the data to select one of the plurality of windows or to cancel a window having correspondence from other input data among the data input from the input means, the data distinction means referring to the data distinction information storage unit to judge whether the input data is the window selection/correspondence cancellation data or the data to be displayed on the window.

According to a further preferred embodiment, the data distinction information storage unit stores, as the distinction information, the data to instruct selection of any window among the plurality of windows or cancellation of any selected window and the data distinction means compares the input data with the data stored in the data distinction information storage unit and judges that the data is for window selection or correspondence cancellation when they are identical and judges that the data is to be displayed on the window when they are not identical.

According to a still another preferred embodiment, a window display control system in a computer further comprises a correspondence display means to display whether the input means has a correspondence with the window as a part of the display means.

According to another preferred embodiment, the display control means refers to the correspondence table and sends and displays the data distinguished as the input data by the data distinction means to the window corresponding to the input means providing the data.

According to a further preferred embodiment, a window display control system in a computer comprises display means capable of displaying a plurality of windows, a plurality of input means for data input, data distinction means which checks the data input from the input means to distinguish the data for selection of a window from the plurality of windows or for cancellation of a selected window from other input data, window selection means to establish or cancel a correspondence between the input means and the window when the data checked by the data distinction means is for selection or cancellation of the window, display control means to send and display the data to the window having correspondence with the input means through operation of the window selection means when the data checked by the data distinction means is found to be a data other than window selection/cancellation data, and a correspondence table to store the information about correspondences between the input means and the windows; the window selection means referring to the correspondence table when the data is found to be window selection data in the distinction by the data distinction means, judging whether there is a correspondence between the input means providing the data and the window selected by the data and, if there is no correspondence, establishing a correspondence between the input means and the selected window or, when the data is found to be for window cancellation in the distinction by the data distinction means, judging whether there is a correspondence between the input means providing the data and the window selected for correspondence cancellation and, if there is, canceling the correspondence between the input means and the selected window.

According to another preferred embodiment, the window selection means renews the correspondence table when any correspondence is established or canceled between the input means and the window, based on the data distinguished by the data distinction means.

According to a still another preferred embodiment, a window display control system in a computer further comprises a data distinction information storage unit storing the distinction information to distinguish the data to select one of the plurality of windows or to cancel a window having correspondence from other input data among the data input from the input means, the data distinction means referring to the data distinction information storage unit to judge whether the input data is the window selection/correspondence cancellation data or the data to be displayed on the window.

According to another preferred embodiment, the data distinction information storage unit stores, as the distinction information, the data to instruct selection of any window among the plurality of windows or cancellation of any selected window and the data distinction means compares the input data with the data stored in the data distinction information storage unit and judges that the data is for window selection or correspondence cancellation when they are identical and judges that the data is to be displayed on the window when they are not identical.

According to a further preferred embodiment, a window display control system in a computer further comprises a correspondence display means to display whether the input means has a correspondence with the window as a part of the display means.

According to another preferred embodiment, the display control means refers to the correspondence table and sends and displays the data distinguished as the input data by the data distinction means to the window corresponding to the input means providing the data.

According to a preferred embodiment to attain the above object, a window display control method in a computer with display means for displaying a plurality of windows and a plurality of input means for inputting data comprises data distinction process for checking the data input from said input means and judging whether said data is an instruction to select a window from said plurality of windows or to cancel a selected window or other data to be input, window selection process for establishing or canceling a correspondence between said input means and said window when the data is found to be an instruction of selection or cancellation of said window by said data distinction means, display control process for displaying the data to said window having correspondence with said input means through operation of said window selection means when the data is found by said data distinction means to be input data other than window selection/cancellation data.

According to another preferred embodiment of a window display control method, said window selection process comprises step for referring a correspondence table storing the information to show correspondences between said input means and said windows, step for judging whether there is a correspondence between said input means providing said window selection instruction and said window selected by said data when the data is found to be an instruction to select a window in said data distinction process, and step for establishing a correspondence between said input means and said selected window, if there is no such correspondence, and step for judging whether there is a correspondence between said input means providing said window cancellation instruction and said window selected by said data when the data is found to be an instruction to cancel a window in said data distinction process, and step for canceling the correspondence between said input means and said selected window, if there is such correspondence.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Referring to the attached figure, preferred embodiments of the present invention will be described in detail below.

Figure 1:
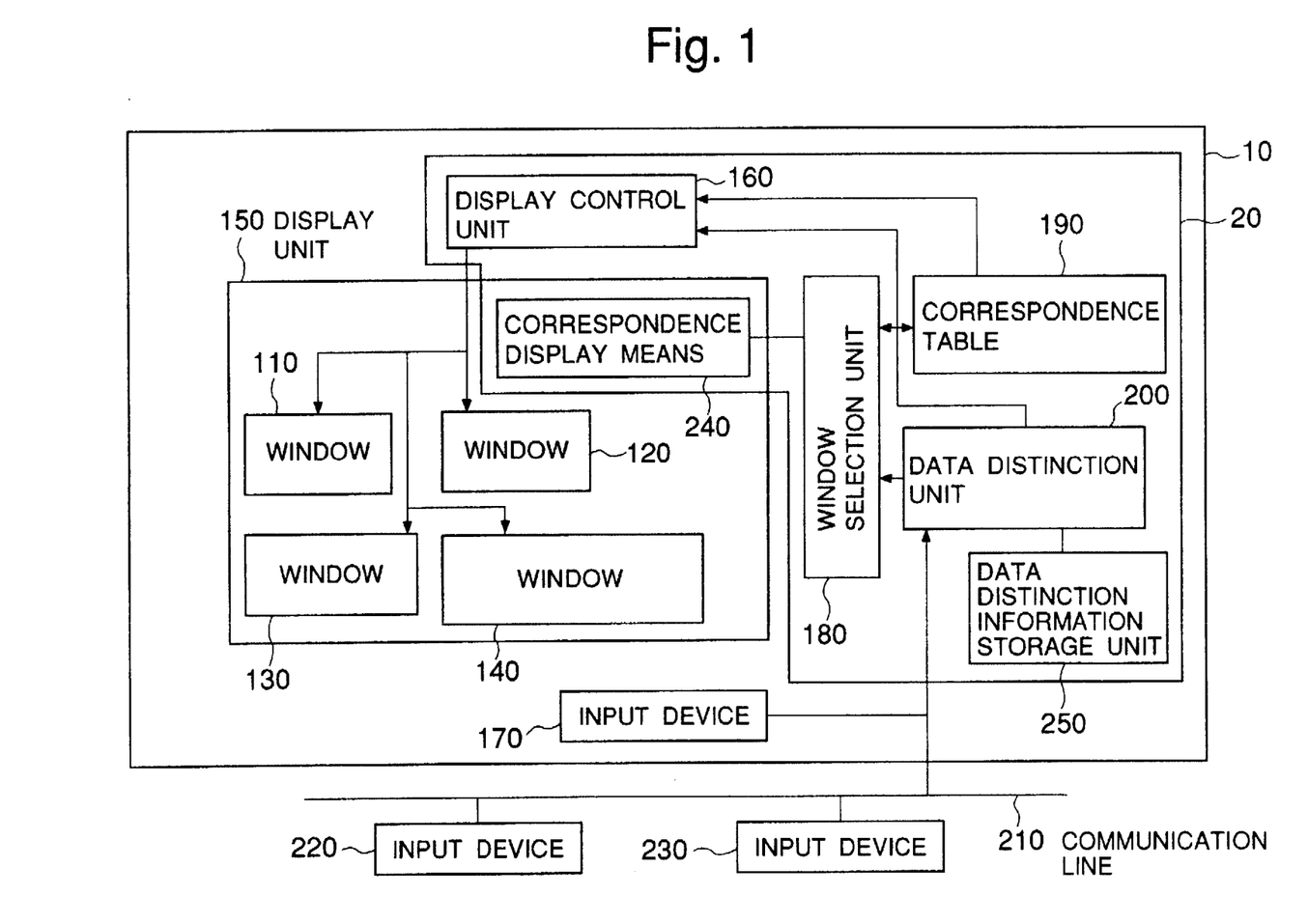
FIG. 1 is a block diagram to show the configuration of a window display control system according to an embodiment of the present invention.

FIG. 1 is a block diagram to show the configuration of a window control system to be used in a computer terminal to accomplish the window control method according to an embodiment of the present invention.

As shown in the figure, a computer terminal 10 to accomplish the window control method of the present invention comprises a display unit 150, a window display control system 20 to control window displays with providing a plurality of windows on the display screen of the display unit 150 and a plurality of input devices for data input 170, 220 and 230. Note that the sections other than above in the computer terminal 10 are omitted in FIG. 1. It is naturally understood that the computer terminal 10 to accomplish the window control method of the present invention, in addition to how it is described above, actually comprises a CPU, memories, interface units and other components. The window display control system 20 comprises a data distinction unit 200 to classify the data input from the input devices 170, 220 and 230 according to their type, a window selection unit 180 to establish correspondences between windows 110 to 140 and the input devices 170, 220 and 230, a display control unit 160 to control the data input for the windows 110 to 140 from the input devices 170, 220 and 230, a correspondence table 190 to store the information about correspondences between the input devices 170, 220 and 230 and the windows 110 to 140 and a data distinction information storage unit 250 to store registered data distinction information for data distinction by the data distinction unit 200.

The display unit 150 may be a CRT or LCD display unit. On the display screen of the display unit 150, a plurality of windows 110 to 140 are displayed at the same time as shown in the figure. The number of windows displayed on the display unit 150 is not limited to four as shown in the figure and may be more or less. The display screen of the display unit 150 is, in addition to these windows 110 to 140, provided with an area to display the processing result of the window selection unit 180, as a correspondence display means 240. The correspondence display means 240 displays, for example, a table of correspondence status between the windows 110 to 140 and the input devices 170, 220 and 230 as shown in FIGS. 5 to 8 to be described later.

The input devices 170, 220 and 230 may be a keyboard, a mouse or other devices. As shown in the figure, the input device 170 is connected directly to the data distinction unit 200 and the input devices 220 and 230 are connected to the data distinction unit 200 via a communication line 210. They are used for input of window selection data, window cancellation data and other data. The window selection data is provided to select one of the windows 110 to 140 displayed on the display unit 150 for correspondence with one of the input deices 170, 220 and 230 for data input. The window cancellation data is supplied to cancel the correspondence already established for the window having correspondence with one of the input devices 170, 220 and 230. "Other data" means the data to display certain information in the corresponding window.

The above data distinction unit 200 processes the data input from the input devices 170, 220 and 230 to distinguish window selection/cancellation data from other data to be input to a window. Such distinction of data by the data distinction unit 200 is made by reference to the data distinction information storage unit 250 having the window selection data and window cancellation data registered as the data distinction information. The window selection/cancellation data are registered as data distinction information to the data distinction information storage unit 250 prior to data input from the input devices 170, 220 and 230. Such window selection data and window cancellation data are constructed by a plurality of key codes, for example.

Figure 2:
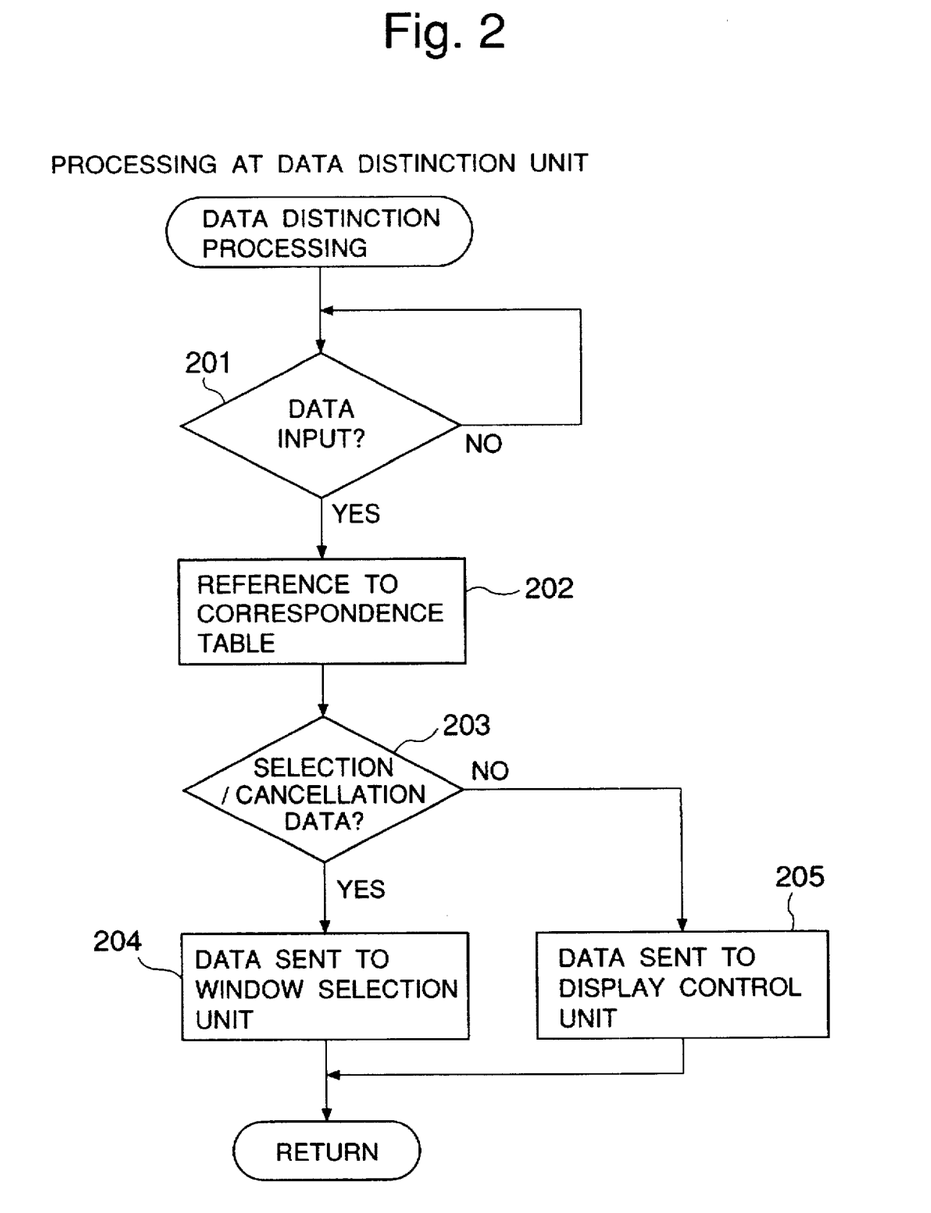
FIG. 2 is a flowchart to illustrate the processing at the data distinction unit in FIG. 1.

Referring now to the flowchart of FIG. 2, the processing at the data distinction unit 200 is described in detail below.

Upon receipt of data input from one of the input devices 170, 220 and 230, the data distinction unit 200 refers to the data distinction information storage unit 250 to classify the input data (Steps 201 and 202). As a result of the data distinction, if the input data is found to be the window selection/cancellation data, it is sent to the window selection unit 180 (Steps 203 and 204); if not, input data are sent to the display control unit 160 (Steps 203 and 205).

The window selection unit 180, upon receipt of window selection/cancellation data from the data distinction unit 200, refers to the correspondence table 190 storing the information about correspondence between the windows 110 to 140 and the input devices 170, 220 and 230; it judges whether a correspondence can be established between one of the windows 110 to 140 selected by the window selection data and the input device 170, 220 or 230 providing the window selection data. FIGS. 5 to 8 show examples of the correspondence table 190. In the figures showing the correspondence table 190, a triangle indicates that a correspondence can be established between the applicable window 110, 120, 130 or 140 and the input device 170, 220 or 230; a cross indicates that they cannot be in correspondence and a circle indicates that they are already in correspondence.

Figure 3:
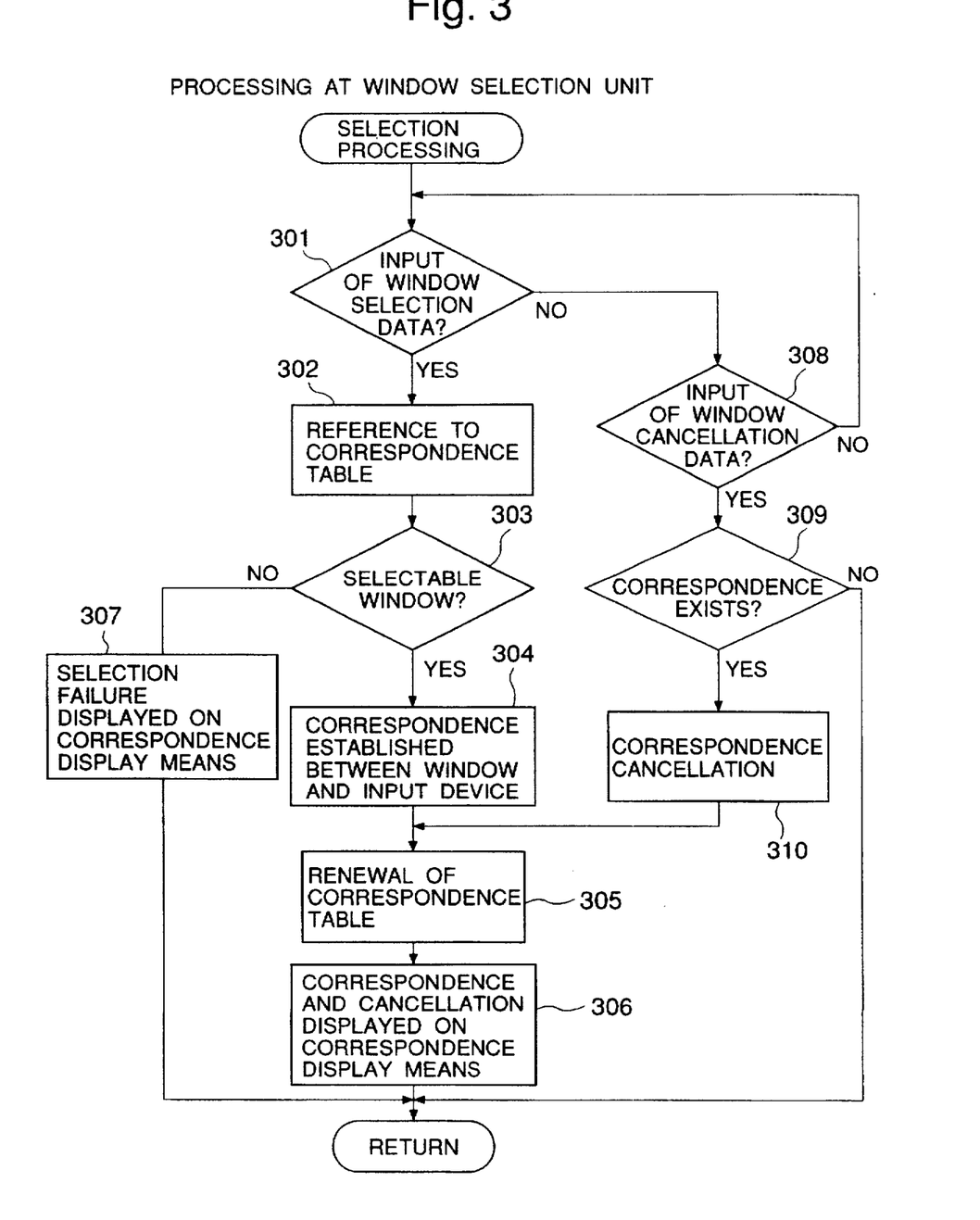
FIG. 3 is a flowchart to illustrate the processing at the window selection unit in FIG. 1.

Referring now to the flowchart of FIG. 3, the processing at the window selection unit 180 is described in detail below.

Figure 5:
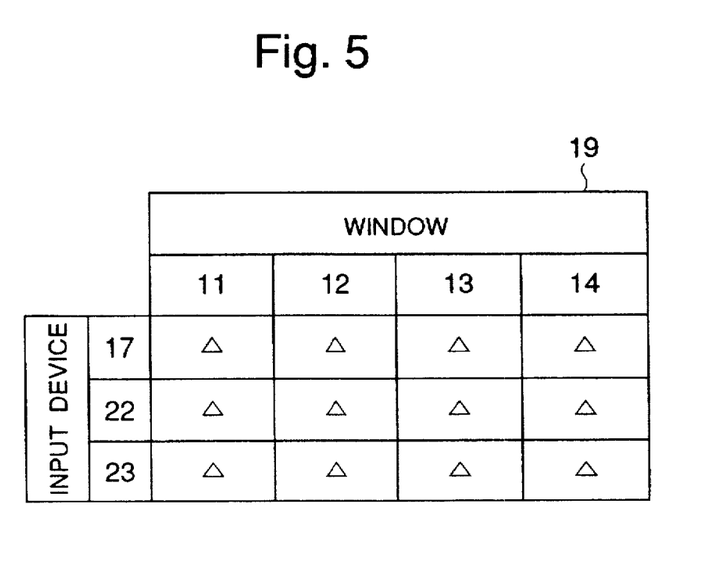
FIG. 5 is a diagram to show the initial status of the correspondence table of FIG. 1.

Upon receipt of window selection data input, the window selection unit 180 refers to the correspondence table 190 (Steps 301 and 302). As shown in FIG. 5, the correspondence table 190 allows any correspondence between any of the input devices 170, 220 and 230 and any one of the windows 110 to 140 in the initial status. When the input device 170, 220 or 230 providing the window selection data is allowed to have a correspondence with the selected window 110, 120, 130 or 140, a correspondence is established between the applicable window 110, 120, 130 or 140 and the applicable input device 170, 220 or 230 (Steps 303 and 304). Then, the correspondence table 190 is renewed (Step 305) and the correspondence display means 240 indicates that the new correspondence is successfully established (Step 306).

Figure 6:
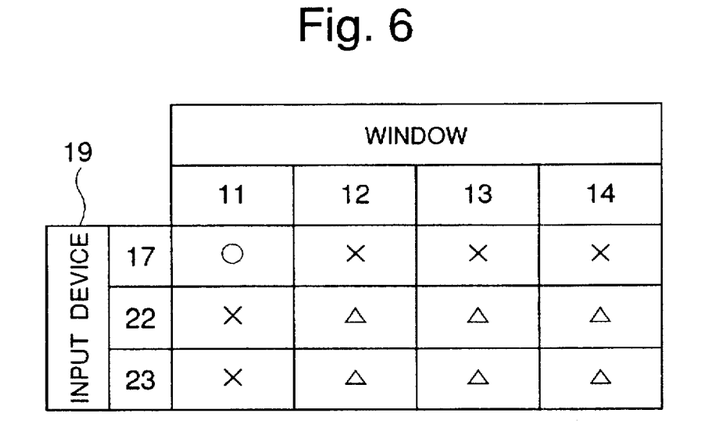
FIG. 6 is a diagram to show the status of the correspondence table when a correspondence between an input device and a window is added to the status of FIG. 5.

FIG. 6 shows an example of the contents of the correspondence table 190 where a correspondence between the input device 170 and the window 110 is added to the initial status. In this status, the window 110 cannot be selected from the input devices 220 and 230 and the input device 170 cannot select windows 120, 130 and 140.

Figure 7:
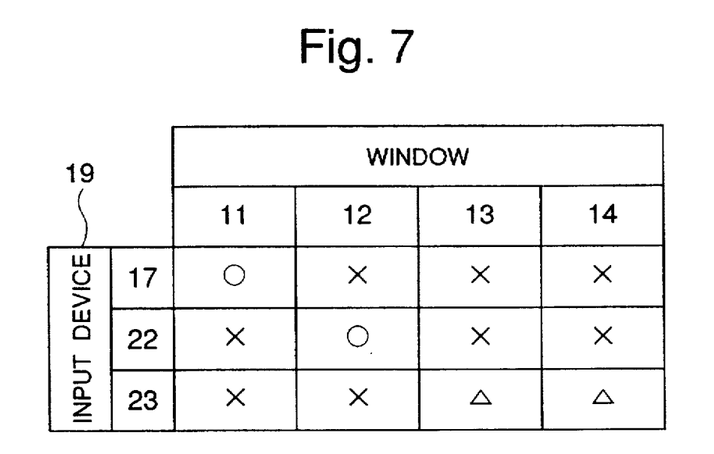
FIG. 7 is a diagram to show the status of the correspondence table when one more correspondence between another input device and another window is added to the status of FIG. 6.

FIG. 7 shows another example of the contents of the correspondence table 190 where another correspondence is established between the input device 220 and the window 120 and added to the status of FIG. 6. In this status, in addition to the incapabilities in FIG. 6, the window 120 cannot be selected by the input device 230 and the input device 220 cannot select windows 130 and 140.

When the selected window 110, 120, 130 or 140 already has a correspondence with any of the input devices and cannot have a correspondence with one of the input devices 170, 220 and 230 providing the window selection data, the window selection unit 180 displays a message to the effect that the selection is failed on the correspondence display means 240 (Steps 303, 307).

Figure 8:
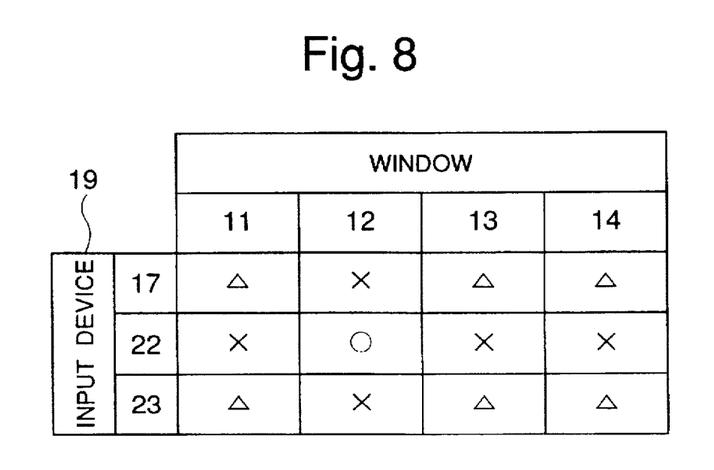
FIG. 8 is a diagram to show the status of the correspondence table when a correspondences between an input device and a window is canceled from the status of FIG. 7.

On the other hand, upon receipt of window cancellation data input, the window selection unit 180 refers to the correspondence table 190 and judges whether there is any correspondence between the input device 170, 220 or 230 specified by the window cancellation data and the applicable window 110, 120, 130 or 140 (Steps 308 and 309). If there is a correspondence, that correspondence is canceled (Step 310). At the same time, the correspondence table 190 is renewed and the cancellation of selection is displayed on the correspondence display means 240 (Steps 305 and 306). For example, if the correspondence between the input device 170 and the window 110 is canceled in the correspondence status shown in FIG. 7, the contents of the correspondence table 190 becomes as shown in FIG. 8. In this status, the window 110 can accept input from the input devices 170 and 230 and the input device 170 can select the window 130 or 140. In contrast, if there is no applicable correspondence, in the processing of Step 309, nothing is changed.

Figure 4:
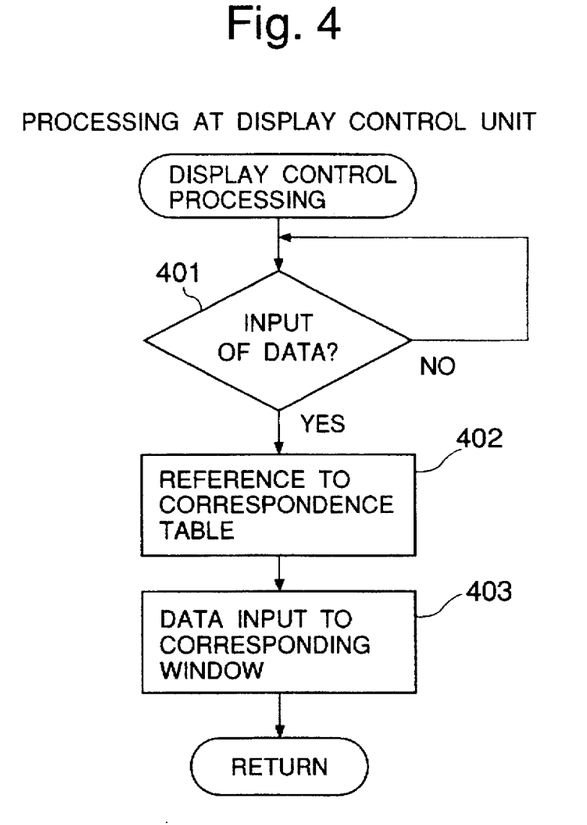
FIG. 4 is a flowchart to illustrate the processing at the window display control unit in FIG. 1.

As shown in the flowchart of FIG. 4, upon receipt of data other than the window selection/cancellation data from the data distinction unit 200 (Step 401), the display control unit 160 refers to the correspondence table 190 (Step 402), controls one of the windows 110 to 140 corresponding to the input device 170, 220 or 230 providing the input and sends data to the applicable window (Step 403).

Once the windows 110 to 140 have correspondences with the input devices 170, 220 or 230, the windows 110, 120, 130 or 140 corresponding to the input devices 170, 220 or 230 can be controlled correctly and quickly in response to the data input from the input devices 170, 220 and 230. Thus, it is easily attained to provide an operation environment where data can be input from a plurality of input devices to a plurality of windows at a time.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

For example, according to the present invention, the display unit 150 reserves a correspondence display means 240 as a part of its screen to display the processing result of the window selection unit 180, as shown in FIG. 1; but it is also possible to provide a separate display unit or other display means to display the processing result of the window selection unit 180.

Besides, according to the present invention, the input device 170 is directly connected to the data distinction unit 200 and the input devices 220 and 230 are connected to the data distinction unit 200 via communication line 210 as shown in FIG. 1; but it is not necessary to connect the devices as in the figure. For example, all input devices 170, 220, 230 may be directly connected to the data distinction unit 200 just via an interface allowing connection of a plurality of input devices. Alternatively, all input devices 170, 220 and 230 may be connected to the data distinction unit 200 via communication lines.

What is claimed is:

1. A window display control system in a computer, comprising:

display means for displaying plurality of windows;

a plurality of input means for inputting data;

data distinction information storage means for storing distinction information to distinguish input data for selection of a window from said plurality of windows as window selection data and input data for cancellation of a selected window as window cancellation data from other input data;

data distinction means for distinguishing whether said input data from said input means is said window selection data or said window cancellation data or the other input data to be displayed on one of said windows by referring to the distinction information stored in said distinction information storage means;

a correspondence table storing information to determine whether or not there is a correspondence between said plurality of input means and said plurality of windows;

window selection means for establishing a correspondence between one of said input means and one of said plurality of windows selected by said window selection data when the data checked by data distinction means is said window selection data, and for canceling a correspondence between one of said input means and a window specified by said window cancellation data which corresponds to a previously selected window when the data checked by said data distinction means is said window cancellation data; and display control means for displaying the data input from one of said input means to said window having correspondence with said input means providing the data when the data checked by said data distinction means is found to be data other than said window selection data and said window cancellation data, wherein said window selection means judges whether there is a correspondence between one of said input means providing said window selection data and said window selected by said window selection data by referring to said correspondence table, and if there is no such correspondence with any of said input means, said window selection means establishes a correspondence between said one of said input means and said selected window of said window selection data, wherein said window selection means judges whether there is a correspondence between one of said input means providing said window cancellation data and said window specified by said window cancellation data by referring to said correspondence table, and if there is such a correspondence, said window selection means cancels the correspondence between said input means and said selected window specified by said window cancellation data, wherein said window selection means renews said correspondence table when any correspondence is established or canceled between any of said plurality of input means and any of said plurality of windows based on the window selection data or said window cancellation data distinguished by said data distinction means, and wherein said correspondence table is renewed when a correspondence is established between said one of said input means and one of said plurality of windows by setting a first value in said correspondence table indicative of a current correspondence between said one of said input means and said one of said plurality of windows, and by setting a second value in said correspondence table indicative of non-allowance of a correspondence between said one of said plurality of windows and all others of said input means.

2. A window display control system in a computer as set forth in claim 1, wherein said window selection means judges whether there is a correspondence between said input means providing the data and said window selected by said window selection data when the data checked by said data distinction means is said window selection data, and if there is no such correspondence, establishes a correspondence between said input means and said selected window of said window selection data; and said window selection means judges whether there is a correspondence between said input means providing the data and the window specified by said window cancellation data when the data checked by said data distinction means is said window cancellation data and, if there is such a correspondence, cancels the correspondence between said input means and said selected window specified by said window cancellation data.

3. A window display control system in a computer as set forth in claim 1, wherein said data distinction information storage means stores, as said distinction information, the window selection data or the window cancellation data to instruct selection of any window among said plurality of windows or cancellation of any selected window, and said data distinction means compares the input data with said distinction information stored in said data distinction information storage means and judges that the data is the window selection data or the window cancellation data when they are identical and judges that the data is to be displayed on one of said windows when they are not identical.

4. A window display control system in a computer as set forth in claim 1, further comprising:

correspondence display means for displaying information to show whether or not there is a correspondence between any of said input means and any of said windows and whether or not the establishment or cancellation of a correspondence between one of said input means and one of said windows succeeded as part of said display means.

5. A window display control system in a computer as set forth in claim 1, wherein said display control means displays the data distinguished as the input data by said data distinction means to said window corresponding to said input means providing said data based on said correspondence table.

6. A window display control system in a computer, comprising:

display means for displaying a plurality of windows;

a plurality of input means for inputting data;

data distinction means for checking the data input from said input means and distinguishing input data for selection of a window from said plurality of windows as window selection data and input data for cancellation of a selected window as window cancellation data from other input data;

window selection means for establishing a correspondence between one of said input means and one of said plurality of windows specified by said window selection data when the data checked by said data distinction means is said window selection data, and for canceling a correspondence between one of said input means and a window specified by said window cancellation data which corresponds to a previously specified window when the data checked by said data distinction means is said window cancellation data;

display control means for displaying the data input from one of said input means to said window having correspondence with said input means providing the data when the data checked by said data distinction means is found to be data other than said window selection data and said window cancellation data; and a correspondence table for storing information about correspondence between said plurality of input means and said plurality of windows, wherein said window selection means refers to said correspondence table, when the data is found to be said window selection data as determined by said data distinction means, judges whether there is a correspondence between one of said input means providing the data and the window selected by said window selection data and, if there is no correspondence with any of said input means, establishes a correspondence between said one of said input means and said window selected in said window selection data, or, when the data is found to be said window cancellation data as determined by said data distinction means, judges whether there is a correspondence between said one of said input means providing the data and the window specified by said window cancellation data and, if there is a correspondence, cancels the correspondence between said one of said input means and said window specified by said window cancellation data, and wherein said correspondence table is renewed when a correspondence is established between said one of said input means and one of said plurality of windows by setting a first value in said correspondence table indicative of a current correspondence between said one of said input means and said one of said plurality of windows, and by setting a second value in said correspondence table indicative of non-allowance of a correspondence between said one of said plurality of windows and all others of said input means.

7. A window display control system in a computer as set forth in claim 6, wherein said window selection means renews said correspondence table when any correspondence is established or canceled between any of said plurality of input means and any of said plurality of windows, based on the data distinguished by said data distinction means.

8. A window display control system in a computer as set forth in claim 6, further comprising:

data distinction information storage means for storing the distinction information to distinguish the window selection data to select one of said plurality of windows and the window cancellation data to cancel a window from other input data among the data input from said input means, wherein said data distinction means judges whether said input data is said window selection data, said window cancellation data or the other input data based on said distinction information storage means.

9. A window display control system in a computer as set forth in claim 8, wherein said data distinction information storage means stores, as said distinction information, the window selection data or the window cancellation data to instruct selection of any window among said plurality of windows or cancellation of any selected window, and said data distinction means compares the input data with said distinction information stored in said data distinction information storage means and judges that the data is the window selection data or the window cancellation data when they are identical and judges that the data is to be displayed on one of said windows when they are not identical.

10. A window display control system in a computer as set forth in claim 6. further comprising:

correspondence display means for displaying information to show whether or not there is a correspondence between any of said input means and any of said windows and whether or not the establishment or cancellation of a correspondence between one of said input means and one of said windows succeeded as a part of said display means.

11. A window display control system in a computer as set forth in claim 6. wherein said display control means displays the data distinguished as the input data by said data distinction means to said window corresponding to said input means providing said data based on said correspondence table.

12. A window display control method in a computer with display means for displaying a plurality of windows and a plurality of input means for inputting data, comprising the steps of:

a data distinction step for checking the data input from said input means and judging whether said data is an instruction to select a window from said plurality of windows or to cancel a selected window or other data to be input;

a window selection step for establishing or canceling a correspondence between one of said input means and one of said windows when the data is found to be an instruction of selection or cancellation of said window as determined by said data distinction step; and a display control step for displaying the data to said one of said windows having correspondence with said of said input means after performing said window selection step when the data is found by said data distinction step to be said other data, wherein said window selection step comprises:

a step for referring to a correspondence table storing information of correspondences between said plurality of input means and said plurality of windows;

a step for judging whether there is a correspondence between one said input means providing said window selection instruction and said window selected by said data when the data is found to be an instruction to select a window in said data distinction step; and a step for establishing a correspondence between said one of said input means and said selected window if there is no such correspondence between said selected window and any of said input means, and for judging whether there is a correspondence between said one of said input means providing said window cancellation instruction and window specified by said data when the data is found to be an instruction to cancel a window in said data distinction step, and for canceling the correspondence between said one of said input means and said specified window, if there is such correspondence, and wherein said correspondence table is renewed when a correspondence is established between said one of said input means and one of said plurality of windows by setting a first value in said correspondence table indicative of a current correspondence between said one of said input means and said one of said plurality of windows, and by setting a second value in said correspondence table indicative of non-allowance of a correspondence between said one of said plurality of windows and all others of said input means.

* * * * *